JAMES F. LOWE, OF LOUISVILLE, KENTUCKY.

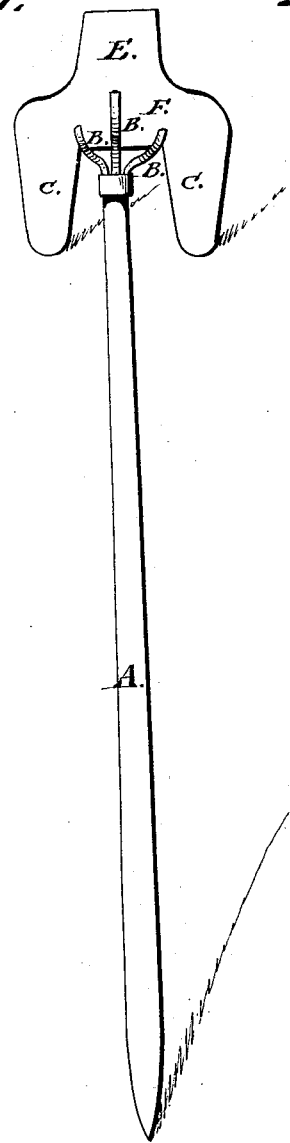

Letters Patent No. 88,051, dated March 23, 1869.

IMPROVEMENT IN HOES.

The Schedule referred to in these Letters Patent and making part of the same.

*To all whom it may concern:*

Be it known that I, JAMES F. LOWE, of the city of Louisville, county of Jefferson, and State of Kentucky, have invented a new and useful Improvement in Gardeners' Cultivator-Hoes; and I do hereby declare that the following is a full, clear, and exact description thereof, reference being had to the accompanying drawings, and to the letters of reference marked thereon.

The nature of my invention, or improvement, consists in constructing a hoe, cut from sheet-steel, with three blades, or cutting-points, and without eye for handle, and having the cutting-edges inside and outside of the two lower blades, in order that the hoe may be used in any position, and particularly in the cultivation of small plants, which require great care to prevent cutting them.

It further consists in the manner of attaching the hoe to the handle, which is done by three prongs, made of small, round iron, having one end welded together, and drawn out sharp, so that it may be inserted in the end of a wooden handle, in the usual manner, while the other ends are bent out in a triangular form, and riveted into the hoe, which attaches it to the handle permanently.

The above being a full description of the nature of the above invention, I will proceed to describe its construction and operation, in which the drawing is a perspective view of the hoe, showing its general construction.

F is the hoe, which is made of sheet-steel, by being cut from a sheet thereof, by die or punch, and the edges thereof being sharpened by grinding or otherwise.

A is the handle, and is made of wood.

B B B are the prongs, by which it is attached to the hoe F, and are made of small, round iron, welded together at one end, and drawn out sharp, so as to be inserted in the end of the wooden handle A, while the other ends are set apart, in a triangular shape, and riveted into the hoe F, attaching it permanently to the handle A, without an eye for the same.

C C are the two lower blades, or cutting-points, having the edges extending entirely around the same, in order that it may be used in any position in cultivating small plants.

E is the upper blade, with but one cutting-edge, and is to be used as the common hoe.

The above is a full description of the construction, and the operation is the same as the common hoe.

Now, therefore, I do not claim anything as original in the hoe; but

What I do claim as my invention, or improvement, and desire to secure by Letters Patent, is—

The bifurcated hoe F, when connected with the handle A by means of three prongs, B B B, riveted to the blade, as described.

JAMES F. LOWE.

Witnesses:
G. B. McDONALD,
L. HEWITT.